United States Patent
Mege et al.

(10) Patent No.: US 9,344,226 B2
(45) Date of Patent: May 17, 2016

(54) DATA PACKET TRANSMISSION METHOD

(71) Applicant: CASSIDIAN SAS, Elancourt (FR)

(72) Inventors: Philippe Mege, Bourg-la-reine (FR); Christophe Molko, Villepreux (FR); Marc Mouffron, Saint Remy les Chevreuses (FR); Christophe Brutel, Espoo (FI)

(73) Assignees: CASSIDIAN SAS, Elancourt (FR); CASSIDIAN FINLAND OY, Helsinki (FI)

( * ) Notice: Subject to any disclaimer, the term of this patent is extended or adjusted under 35 U.S.C. 154(b) by 34 days.

(21) Appl. No.: 14/350,280

(22) PCT Filed: Oct. 5, 2012

(86) PCT No.: PCT/EP2012/069756
§ 371 (c)(1),
(2) Date: Apr. 7, 2014

(87) PCT Pub. No.: WO2013/050550
PCT Pub. Date: Apr. 11, 2013

(65) Prior Publication Data
US 2014/0250325 A1 Sep. 4, 2014

(30) Foreign Application Priority Data
Oct. 7, 2011 (FR) ..................... 11 59081

(51) Int. Cl.
*H03M 13/00* (2006.01)
*H04L 1/18* (2006.01)
(52) U.S. Cl.
CPC ............... *H04L 1/18* (2013.01); *H04L 1/1819* (2013.01); *H04L 1/1845* (2013.01)

(58) Field of Classification Search
CPC ........ H04L 1/18; H04L 1/1819; H04L 1/1845
See application file for complete search history.

(56) References Cited

U.S. PATENT DOCUMENTS

2004/0013105 A1* 1/2004 Ahmavaara et al. .......... 370/349
2007/0253401 A1* 11/2007 Jiang ............................ 370/350

OTHER PUBLICATIONS

Nokia: Solution to Problem of MAC based Ciphering With Type II/III Hybrid ARQ, 3GPP Draft, Mobile Competence Center, Yokohama, May 21, 1999.
Alcatel: "Proposal for RLC+MAC Ciphering Model," 3GPP Draft, Mobile Competence Center, Berlin, May 20, 1999.

* cited by examiner

*Primary Examiner* — Sam Rizk
(74) *Attorney, Agent, or Firm* — Steven M. Greenberg, Esq.; CRGO Law

(57) ABSTRACT

This transmission comprising a first transmission of a packet (52), comprising the steps consisting in: a first processing (54) of said packet (52) to obtain a first packet (56); and a coding (57, 59) of the first packet (56); wherein, when the first coded packet is received erroneous, the method comprises a second transmission of said packet, comprising: the steps implemented in the transmitter, consisting in: a second processing (84) of said packet (52) to obtain a second packet (86); and a coding (87, 89) of the second packet (86); and the steps implemented in the receiver, consisting in: a modification of the first and/or the second coded packets to obtain two packets in which the difference due to the first and second processings is compensated for: a combination (110) of both packets according to a HARQ procedure; and a decoding (112) of the combined packet.

15 Claims, 6 Drawing Sheets

DATA PACKET TRANSMISSION METHOD

CROSS-REFERENCE TO RELATED APPLICATIONS

This application is a §371 national phase entry of International Application No. PCT/EP2012/069756, filed Oct. 5, 2012, which claims priority to French Patent Application No. 1159081, filed Oct. 7, 2011.

The present invention relates to a method for transmitting data packets between a transmitter and a receiver through a radio-electric channel. It also relates to a transmission system, a reception facility and a corresponding computer program.

The scope of the invention lies in radio-electric communications. The invention relates more particularly to data packet transmission systems implementing an automatic repeat request mechanism, so-called ARQ ("Automatic Repeat reQuest").

The ARQ mechanism is an automatic retransmission protocol using an error detection method. According to such protocol, when an error is detected in a data packet, the erroneous packet is rejected and a packet retransmission request is emitted by the receiver. The data packet is then merely retransmitted.

Such mechanism is presently implemented in particular in the professional radio mobile systems, being more known under the English acronym PMR ("Professional Mobile Radio").

Nevertheless, the ARQ retransmission mechanism presents a major drawback related to a reduction of the effective data flow rate. Such flow rate reduction becomes important when the channel is noisy, thereby increasing the error rate and, consequently, the number of repetitions.

In order to remedy such drawback, some radio communication systems implement a hybrid automatic repeat request mechanism, so-called HARQ ("Hybrid Automatic Repeat reQuest"), both combining the error detection and correction and optimizing the performance of the repeat mechanism.

According to the HARQ mechanism, the packet received a first time and detected as erroneous is kept in the memory of the receiver in view to be combined with the same packet being retransmitted, thereby improving the error correction, which has as an effect to reduce the number of retransmission requests. The effective flow rate of the transmission is then significantly improved, in particular when the channel is noisy.

This HARQ protocol is implemented in particular in third and fourth generation systems like HSxPA ("High Speed xlink Packet Access"), LTE ("Long Term Evolution") and WIMAX ("Worldwide Interoperability for Microwave Access").

Moreover, in order to have secured communications, some radio-electric systems implement data encryption procedures. Two types of encryption are thus generally used.

The first type is the end to end encryption, so-called E2EE ("End to End Encryption"). It consists in ciphering data at the source. Ciphering and deciphering are performed on the ends of the communication path. The signal data are not ciphered.

The second type is the radio interface encryption, so-called AIE ("Air Interface Encryption"). It consists in ciphering all data intended to transit through the radio channel, including the signal data. Ciphering and deciphering are respectively made in the transmitter and in the receiver.

In order to guarantee a great efficiency of the transmissions, some systems implement both a HARQ transmission mechanism and an AIE ciphering. This is the case for instance for third generation systems 3GPP ("3$^{rd}$ Generation Partnership Project"), including the universal telecommunication system with the UMTS mobiles ("Universal Mobile Telecommunication System"), or fourth generation systems LTE and WIMAX.

In such systems, the AIE ciphering is made in the transmitter after the data channel coding step. The AIE deciphering is performed in the receiver before the channel decoding step. The HARQ retransmissions are thus managed after the AIE deciphering in this case. In case of retransmission, the data being transmitted are thus always the same. The HARQ procedure is easily implemented in such systems, since the AIE ciphering is transparent in that case.

However, the introduction of the HARQ mechanism is presently impossible in the radio-electric systems implementing the AIE ciphering before the data channel coding operation. This is the case in particular for the PMR systems of the TETRA ("Trans European Trunked Radio") type and of the P25 type such as defined by the TIA ("Telecommunications Industry Association") for the APCO ("Association of Publicsafety Communications Officers"). In fact, in these systems, the AIE ciphering has as an effect to change the transmitted data being coded at each retransmission of a same packet, thereby making the implementation of the HARQ mechanism impossible.

The present invention aims at improving the situation.

With this end in view, the present invention first relates to a data packet transmission method between a transmitter and a receiver through a radio-electric channel, said method comprising a first transmission of a packet, said first transmission comprising:

the steps implemented in the transmitter, consisting in:
a first linear processing of said packet so as to obtain a first packet;
a linear error detecting coding of the first packet through an error detecting code so as to obtain a first intermediate packet; and
a linear error correcting coding of the first intermediate packet through a first error correcting code so as to obtain a first coded packet;

a method wherein, when the first coded packet is received and that it is detected by said method that it is erroneous, the method comprises at least a second transmission of said packet, the second transmission comprising:

the steps implemented in the transmitter, consisting in:
a second linear processing of said packet, said second processing being different from said first processing so as to obtain a second packet different from the first packet;
a linear error detecting coding of the second packet through said error detecting code so as to obtain a second intermediate packet; and
a linear error correcting coding of the second intermediate packet through a second error correcting code so as to obtain a second coded packet;

and the steps implemented in the receiver, consisting in:
a modification of the first coded packet and/or of the second coded packet so as to obtain two packets in which the difference due to the first and second processings is compensated for;
a combination of both packets according to an hybrid automatic repeat request (HARQ) procedure; and
a decoding of the combined packet through a third error correcting code depending on the first and second error correcting codes.

Thanks to the modification by the receiver of the first coded packet and/or the second coded packet, it is possible to compensate for the effects of the difference of processing of the data packet from one transmission to another and thus to simply implement the HARQ mechanism. Remarkably, the present invention operates linearity characteristics being inherent to the transmission system, in particular an error detection channel coding and a linear error correcting channel coding, and to the processings implemented on the data packets. Indeed, the modification allowing a HARQ combination is possible, since the processings and the codings are linear.

Advantageously, the first processing is a linear ciphering through a first sequence of ciphering keys and the second processing is a linear ciphering through a second sequence of ciphering keys being different from the first sequence.

The AIE ciphering is generally linear, since it must not propagate errors. In the PMR systems, this ciphering often consists in applying an "exclusive OR" between the data and the sequence of ciphering keys corresponding to the number of the time period during which the data are transmitted. This operation of so-called "exclusive OR" is of course linear. The invention thus applies perfectly to the PMR systems.

According to a first embodiment of the present invention, the modification step comprises the sub-steps of:
coding the first sequence of ciphering keys through the error detecting code and the first error correcting code and the second sequence of ciphering keys through the error detecting code and the second error correcting code;
deciphering the first coded packet through the first sequence of coded keys; and
deciphering the second coded packet through the second sequence of coded keys.

Advantageously, the deciphering is applied to flexible decisions, in particular coming from a received signal demodulator. Preferably, in order to guarantee the security of the transmission, the coding/decoding and deciphering operations are grouped together in a same module.

According to a second embodiment, the modification step comprises the sub-steps of:
coding the difference between the first and second key sequences through the error detecting code and the first or respectively the second error correcting code; and
using the coded difference to modify the first coded packet or respectively the second coded packet.

In other words, two alternative embodiments are envisaged in the scope of this embodiment. In the first variation, the difference between the first and the second key sequences is coded through the error detecting code and the first error correcting code and this coded difference is used so as to modify the first coded packet. In the second variation, the difference between the first and the second key sequences is coded through the error detecting code and the second error correcting code and this coded difference is used so as to modify the second coded packet.

Thanks to the coding of the difference between the key sequences, the security is improved. Indeed, the deciphering module of the receiver only provides the difference between the key sequences to the signal processing modules in charge of the coding/decoding. No secret information can be recovered outside the deciphering module without knowledge of the preceding ciphering key, in particular the initial one, i.e. the one of the first packet transmission.

According to a third embodiment, the modification step comprises the sub-steps of:
generating a new sequence of ciphering keys;
coding a first difference between the first key sequence and the new key sequence through the error detecting code and the first error correcting code;
coding a second difference between the second key sequence and the new key sequence through the error detecting code and the second error correcting code;
using the first coded difference so as to modify the first coded packet; and
using the second coded difference so as to modify the second coded packet.

Advantageously, the HARQ procedure is a HARQ-Chase procedure.

This procedure is very simple, the first and second error correcting codes applied to the first and second packets being identical in this case. The decoding is carried out with the same error correcting code too. Preferably, the combination is performed by calculation of flexible decisions through logarithmic likelihood ratios, so-called LLR ("Log Likelihood Ratios"). The HARQ-Chase then consists in summing the LLRs of the different transmissions of a same packet.

Alternatively, the HARQ procedure is a HARQ procedure with incremental redundancy.

This procedure, so-called IR-HARQ ("Incremental redundancy—HARQ") allows the effective data flow rate to be improved. In such procedure, the second error correcting code possesses a higher redundancy than the first error correcting code. The third error correcting code is then a concatenation of the first and second error correcting codes.

Both HARQ-Chase and IR-HARQ procedures can be combined so as to obtain better results.

The invention also relates to a data packet transmission system between a transmitter and a receiver through a radio-electric channel, said system comprising first means for implementing a first transmission of a packet, said first means comprising means implemented in the transmitter, consisting in:
a first linear processing for said packet so as to obtain a first packet;
a linear error detecting coding of the first packet through an error detecting code so as to obtain a first intermediate packet; and
a linear error correcting coding of the first intermediate packet through a first error correcting code so as to obtain a first coded packet;
a system wherein, when the first coded packet is received and that it is detected that it is erroneous, the system comprises second means for implementing at least a second transmission of said packet, said second means comprising:
means implemented in the transmitter, consisting in:
a second linear processing of said packet, said second processing being different from the first processing so as to obtain a second packet being different from the first one;
a linear error detecting coding of the second packet through said error detecting code so as to obtain a second intermediate packet; and
a linear error correcting coding of the second intermediate packet through a second error correcting code so as to obtain a second coded packet;
and means implemented in the receiver, consisting in:
modifying the first coded packet and/or the second coded packet so as to obtain two packets in which the difference due to the first and second processings is compensated for;
combining both packets according to a hybrid automatic repeat request (HARQ) procedure; and
decoding the combined packet through a third error correcting code depending on the first and second error correcting codes.

The invention also relates to a receiving facility comprising means for implementing the steps of the method of the invention, consisting in:
    modifying the first coded packet and/or the second coded packet so as to obtain two packets in which the difference due to the first and second processings is compensated for;
    combining both packets according to a hybrid automatic repeat request (HARQ) procedure; and
    decoding the combined packet through the third error correcting code.

The invention also relates to a computer program comprising instructions for implementing the method of the invention when the program is runned by at least one processor.

The block diagrams of FIGS. 2 to 5 schematically illustrate the running of this computer program for preferred embodiments of the invention.

Embodiments of the invention will now be described in a more precise, but not limitative way referring to the accompanying drawings, wherein.

Figure 1:
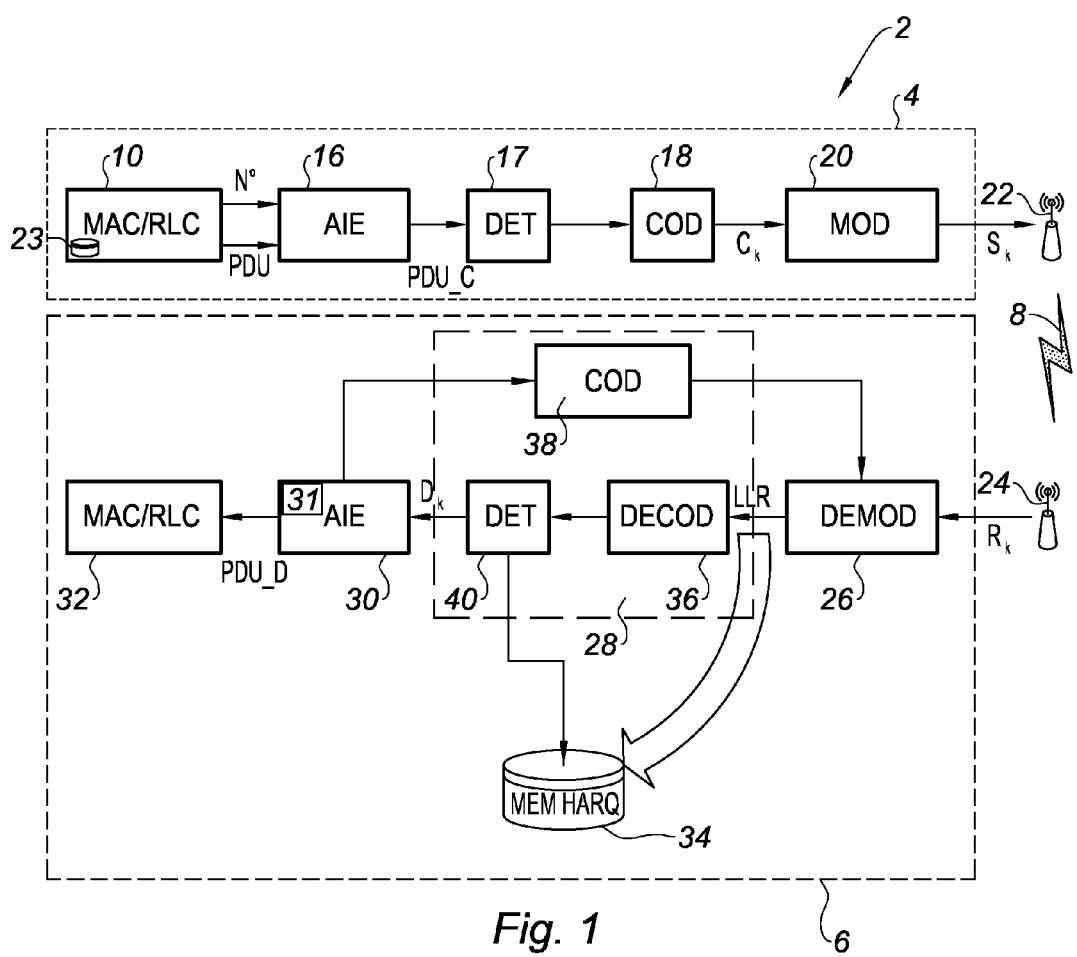
FIG. 1 is a schema of the data packet transmission system of the invention.

FIG. 1 represents a transmission system 2 for data packets between a transmitter 4 and a receiver 6 through a radio-electric channel 8.

The transmitter 4 and the receiver 6 consist here in a terminal and a base station of a PMR system. Thus, the transmission concerned by the present invention can be a transmission in the rising direction, i.e. from the terminal to the base station or a transmission in the descending direction, i.e. from the base station to the terminal.

The invention is not however limited to this case and also applies to the case of two terminals operating in a direct mode.

The transmitter 4 comprises five main modules, which are a packet formation module 10, a ciphering module 16, and an error detecting coding module 17, an error correcting coding module 18 and a modulator 20. It also comprises an antenna 22.

The packet formation module 10 implements the MAC/RLC ("Medium Access Control/Radio Link Control") protocol. It is adapted to provide binary data packets, so-called PDU or protocol data units on successive time slots identified by their numbers no. It comprises a buffer memory 23 to store the packets being formed so as to be able to find them for a possible retransmission.

The ciphering module 16 implements a linear ciphering of the AIE radio interface of the PDU packets being formed. Such ciphering is linear in that the combination between the sequence to be ciphered and the ciphering sequence is linear. It is able to generate sequences of ciphering keys depending on the time slot number supplied by the packet formation module 10. Thus, two sequences of ciphering keys generated to cipher two packets transmitted at two different time slots are different. The ciphered PDU packets so-called PDU_C are provided in output of the ciphering module 16.

The error detecting coding module 17 allows the ciphered PDU packets to be coded so as to enable for an error detection at the level of the receiver 6. The error detecting code implemented in the error detecting coding module 17 is linear. It is for instance a cyclic redundancy code CRC "(Cyclic Redundancy Check")".

The error correcting coding module 17 allows the PDU packets being ciphered by the ciphering module 16 and coded by the error detecting code of the error detecting coding module 17 to be coded. The error correcting code implemented in the error correcting coding module 18 is a linear code. It is for example a convolutional code or a turbo-code. Ck data coded by the error correcting code are thus supplied in output of the error correcting coding module 18.

Advantageously, the error detecting coding and error correcting coding modules (17, 18) can be combined in a same module implementing both the detection and the correction of errors.

The modulator 20 provides for the modulation of the Ck coded binary data supplied by the error correcting coding module 18 in data symbols Sk according to a conventional modulation technique, for example a quadrature amplitude modulation MAQ. It also allows the frame locking of the data symbols for synchronization with the receiver 6.

The receiver 6 comprises an antenna 24 and four main modules allowing data to be recovered. Such modules are a demodulator 26, a channel decoding module 28, a deciphering module 30 and a data separation module 32.

The demodulator 26 provides for the frame unlocking and the demodulation of received data symbols. It implements a flexible output demodulation mechanism, for instance by calculation of logarithmic likelihood ratios LLR.

A buffer memory 34 provided in the receiver 6 allows the calculated ratios LLR to be stored.

The channel decoding module 28 comprises three sub-modules which are an error correcting decoding sub-module 36, a coding sub-module 38, combining an error detecting coding and an error correcting coding, and an error channel decoding sub-module 40.

The error correcting decoding sub-module 36 provides for the decoding of the ratios LLR through the error correcting code implemented in the error correcting coding module 18 to supply decoded data packets.

The coding sub-module 38 allows information coding, in particular ciphering keys, through the error detecting code implemented in the error detecting coding module 17 and the error correcting code implemented in the error correcting coding module 18.

The error detecting decoding sub-module 40 implements the error detecting code implemented in the error detecting coding module 17 so as to detect possible errors in the decoded error packets.

The deciphering module 30 provides for the calculation of the sequences of ciphering keys and the AIE deciphering of the decoded packets through the same sequences of ciphering keys used by the ciphering module 16 to cipher them.

The data separation module 32 allows the deciphered data packets to be separated by implementing the MAC/RLC protocol.

Different embodiments of the transmission method implemented by the system 2 will now be described referring to the block diagrams of FIGS. 2 to 5.

Figure 2:
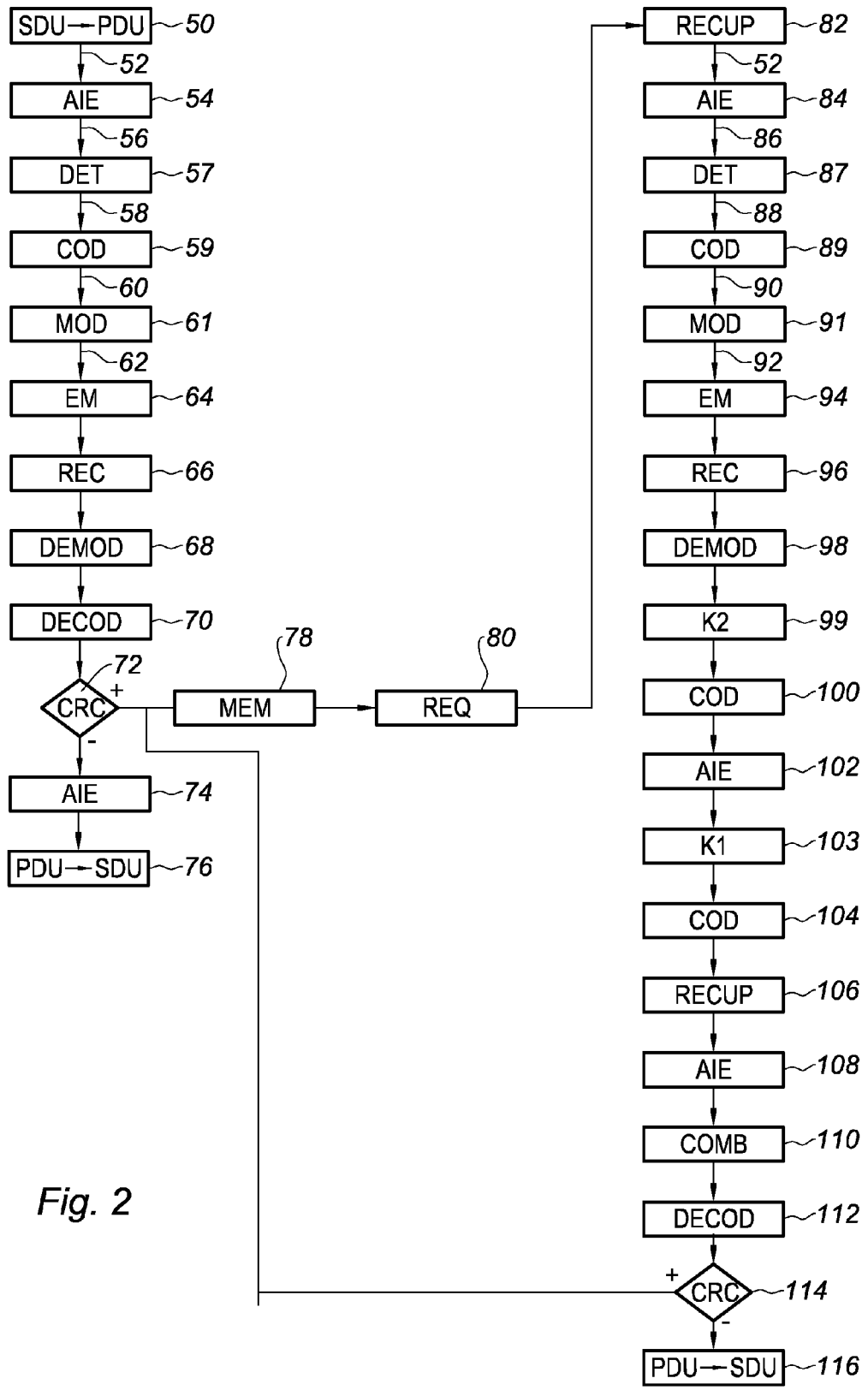
FIG. 2 is a bloc diagram illustrating the operation of the packet transmission method according to a first embodiment of the invention.

FIG. 2 illustrates a first embodiment of the invention.

At step 50, the packet formation module 10 receives binary data to be transmitted, so-called service data units or SDU ("Service Data Units") units. It adds to these data a header so as to form a data packet PDU 52 that it saves in the memory 23.

At step 54, the ciphering module 16 receives the data packet PDU 52 as well as the slot time number no. corresponding to this packet. It generates a first sequence of ciphering keys depending on the slot time number no. and ciphers the packet 52 with this first sequence so as to obtain a first packet 56. Ciphering is linear. It is performed for instance by carrying out an "exclusive OR" between the data packet 52 and the first sequence of ciphering keys.

At step 57, the error detecting coding module 17 codes the first packet 56 through a linear error detecting code, for instance a CRC code, and supplies in output a first intermediate packet 58.

At step 59, the error correcting coding module 18 codes the first intermediate packet 58 through the linear error correcting code and supplies in output a first coded packet 60.

At step 61, the modulator 30 modulates the data from the first coded packet 60, for instance with a MOQ modulation 16 so as to provide a signal 62 bearing complex data symbols being organized in frames.

At step 64, the signal 62 is emitted by the antenna 22 across the radio-electric channel 8.

At step 66, the signal 62, possibly noisy and/or distorted by the channel 8, is received by the antenna 24 of the receiver 6.

At step 68, the demodulator 26 performs the frame unlocking, i.e. the synchronization of the signal 62, and demodulates it according to a flexible decision demodulation mechanism. To do that, the demodulator 26 calculates flexible decisions, preferably first LLR logarithmic likelihood ratios.

The first calculated LLR ratios are decoded at step 70 by the error corrector decoding module 36.

At step 72, the error detecting decoding sub-module 40 detects the presence of possible errors in the first decoded LLR ratios.

If no error is detected, the first decoded LLR ratios are deciphered at step 74 by the deciphering module 30 with the first sequence of ciphering keys so as to obtain a deciphered PDU packet.

At step 76, the separation module 32 separates the data of the deciphered PDU packet so as to provide the binary SDU data. Then, it emit a positive acknowledge towards the packet formation module 10 of the transmitter 4 so as to indicate that the packet 52 has been well received with no error.

Should at least one error be detected, the first calculated ratios LLR are saved at step 78 in the buffer memory 34. The receiver 6 sends, at step 80, a retransmission request for the packet 52 toward the transmitter 4.

Upon receipt of such request, the transmitter 4 recovers at step 82 the packet 52 from the memory 23.

At step 84, the ciphering module 16 receives the data packet 52 as well as the number of the new slot time corresponding to this packet. It generates a second sequence of ciphering keys depending on the slot number depending on the slot number and ciphers the packet 52 with this second sequence so as to obtain a second packet 86.

Since the packet is emitted upon a slot time being different from the one of the first transmission, the second key sequence is different from the first key sequence. The second packet 86 is thus different from the first packet 56.

At step 87, the error detecting coding module 17 codes the second packet 86 through a linear error detecting code and supplies in output a second intermediate packet 88.

At step 89, the error correcting coding module 18 codes the second intermediate packet 88 through the linear error correcting code and supplies in output a second coded packet 90.

At step 91, the modulator 20 modulates the data from the second coded packet to supply a signal 92 bearing complex data symbols being organized in frames.

At step 94, the signal 92 is emitted by the antenna 22 through the radio-electric channel 8.

At step 96, the signal 92 possibly noisy and/or distorted by the channel 8 is received by the antenna 24 of the receiver 6.

At step 98, the demodulator 26 performs the frame unlocking, i.e. the synchronization of the signal 92, and demodulates it according to a flexible decision demodulation mechanism by calculating the second LLR logarithmic likelihood ratios.

At step 99, the deciphering module 30 produces the second sequence of ciphering keys.

At step 100, the coding sub-module 38 codes the second sequence of ciphering keys through the detecting code and the error correcting code.

At step 102, the flexible deciphering sub-module 31 deciphers the second LLR ratios through the second coded key sequence. Thanks to the linearity of the correcting code and the ciphering, further to this flexible deciphering, the second deciphered LLR ratios correspond to the coded packet 52.

Upon deciphering, at step 102, the flexible deciphering sub-module 31 modifies the second LLR ratios through the second coded key sequence according to the following relationship:

$$LLR2\_m(k)=LLR2(k)*(1-2*K2\_coded) \text{ for } k=0\ldots N-1,$$

wherein:

N is the number of LLR ratios per coded PDU packet;
K2_coded is the second coded key sequence;
LLR2(k) is the second LLR ratio; and
LLR2_m(k) is the second modified LLR ratio.

At step 103, the deciphering module 30 produces the first sequence of ciphering keys. At step 104, the coding sub-module 38 codes the first sequence of ciphering keys through the error detecting code and the error correcting code.

At step 106, the first LLR ratios are recovered from the buffer memory 34.

At step 108, the flexible deciphering sub-module 31 deciphers the first LLR ratios being recovered through the first coded key sequence. Thanks to the linearity of the correcting code and the ciphering, further to this flexible deciphering, the first deciphered LLR ratios being obtained correspond to the coded packet 52.

Upon deciphering, at step 108, the flexible deciphering sub-module 31 modifies the first LLR ratios through the first coded key sequence according to the following relationship:

$$LLR1\_m(k)=LLR1(k)*(1-2*K1\_coded) \text{ for } k=0\ldots N-1,$$

wherein:

N is the number of LLR ratios per coded PDU packet;
K1_coded is the first coded key sequence;
LLR1(k) is the first LLR ratio; and
LLR1_m(k) is the first modified LLR ratio.

At step 110, a HARQ-Chase combination of the first deciphered LLR ratios and of the second deciphered LLR ratios is carried out, simply by summing such LLR ratios so as to obtain combined LLR ratios.

The combined LLR ratios are decoded at step 112 by the error correcting decoding sub-module 36 to obtain the decoded PDU packet.

At step 114, the error detecting decoding sub-module 40 detects the presence of possible residual errors.

If no error is detected, the separation module 32 separates at step 116 the data of the decoded PDU packet so as to supply binary SDU data. Then, it emits a positive acknowledgment towards the packet formation module 10 of the transmitter 4 to indicate that the packet 52 has being well received with no error.

If at least one error is detected, the method goes on from step 78 by saving the second LLR ratios calculated by the demodulator 26 and a new transmission of the packet 52.

This first embodiment is very simple to be implemented. It needs nevertheless the supply of sequences of ciphering keys as such from the deciphering module 30 to the decoding module 28. This supply is not desired in some applications for security reasons. However, the first embodiment also applies to these cases. It is in fact enough to integrate the operations of channel coding/decoding and flexible deciphering 31 into the deciphering module 30.

Figure 3:
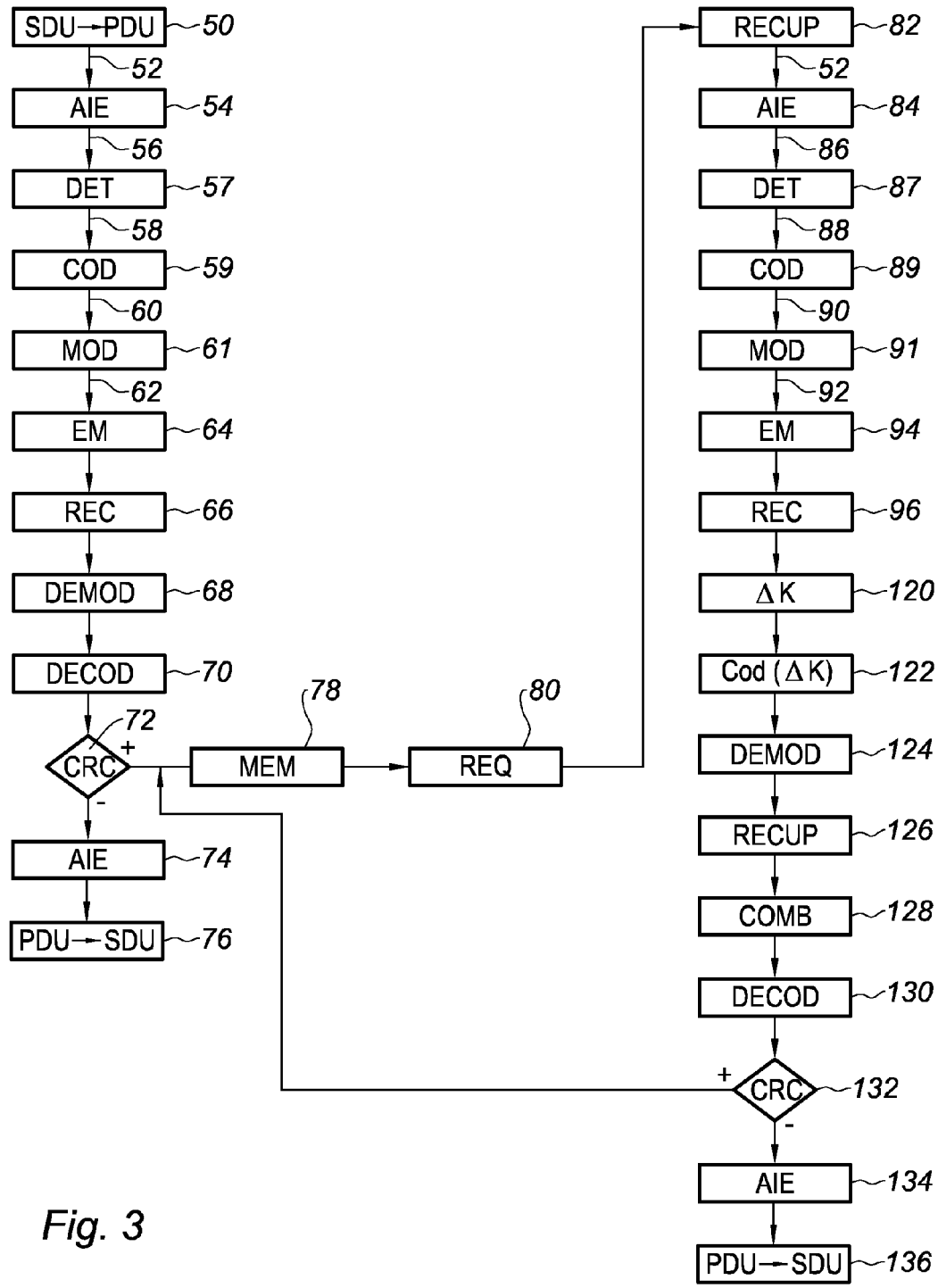
FIG. 3 is a block diagram illustrating the operation of the packet transmission method according to a second embodiment of the invention.
Figure 4:
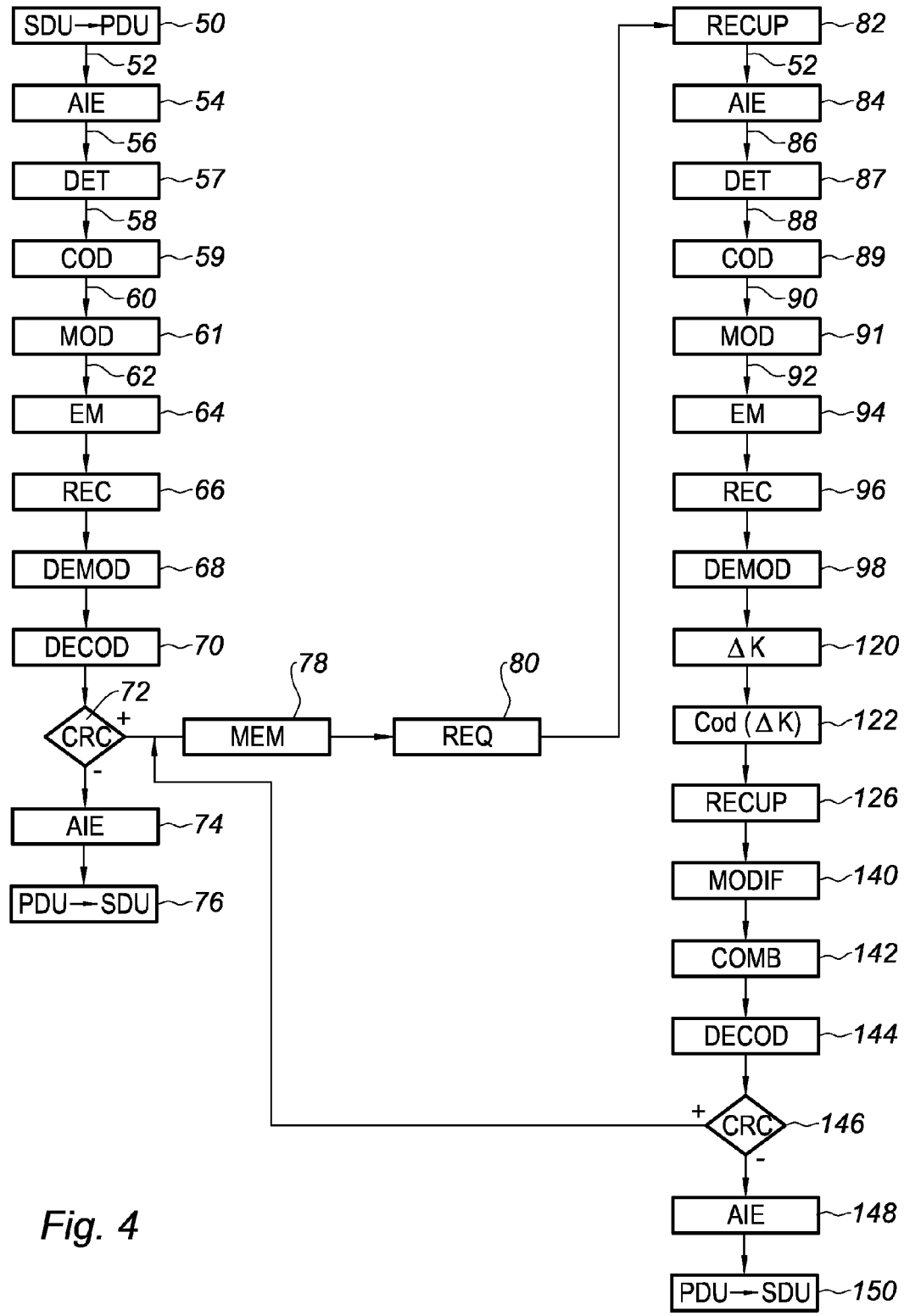
FIG. 4 is a bloc diagram illustrating the operation of the packet transmission method according to a third embodiment of the invention.
Figure 5:
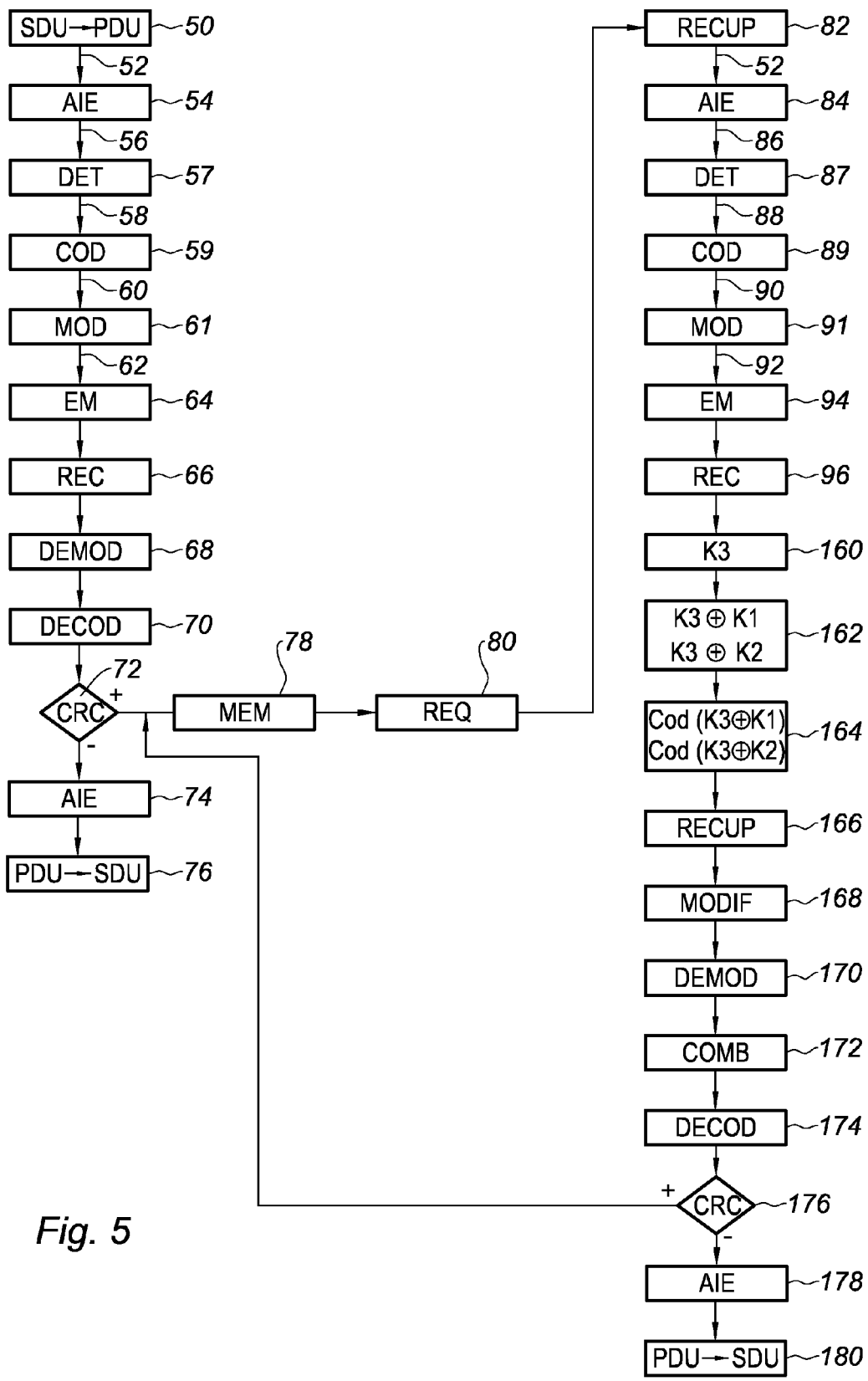
FIG. 5 is a block diagram illustrating the operation of the packet transmission method according to a fourth embodiment of the invention.

The embodiments described referring to FIGS. 3 to 5 allow such explicit supply of sequences of ciphering keys to be avoided and the security of the transmission to be thus improved.

On these figures, the steps 50 to 96 are identical to those of FIG. 2. The description of such steps will thus not be repeated.

FIG. 3 illustrates a second preferred embodiment of the invention.

According to this embodiment, further to the reception of the emitted signal at step 96, the deciphering module 30 calculates at step 120 the difference between the first and the second sequences of ciphering keys. To do so, it performs an "exclusive OR" operation between the two key sequences. It supplies then this difference to the coding sub-module 38 of the decoding module 28. Thus, the security regulations are provided in this case, since no secret information can be recovered outside the deciphering module 30 with no knowledge of one of the two key sequences.

At step 122, the coding sub-module 38 codes the difference between the key sequences through the error detecting code and the error correcting code. And then, it supplies the coded difference to the demodulator 26.

At step 124, the demodulator 26 performs the frame unlocking, i.e. the synchronization of the signal 92, and demodulates it according to a flexible decision demodulation mechanism by calculating the second LLR logarithmic likelihood ratios. It modifies these LLR ratios through the coded difference according to the following relationship:

$$LLR2\_m(k)=LLR2(k)*(1-2*cod\Delta k) \text{ for } k=0 \ldots N-1,$$

wherein:
N is the number of LLR ratios per coded PDU packet;
cod$\Delta$k is the coded difference;
LLR2(k) is the second LLR ratio; and
LLR2_m(k) is the second modified LLR ratio.

Thanks to the linearity of the detecting and correcting codes and of the ciphering, further to this modification, the second modified LLR ratios being obtained correspond to the packet 52 coded and ciphered with the first key sequence.

At step 126, the first LLR ratios are recovered from the buffer memory 34.

At step 128, the demodulator 26 performs a HARQ-Chase combination of the first LLR ratios and of the second modified LLR ratios, simply by summing these LLR ratios so as to obtain combined LLR ratios.

The combined LLR ratios are decoded at step 130 by the error correcting decoding sub-module 36 so as to obtain the decoded PDU packet.

At step 132, the error detecting decoding sub-module 40 detects the presence of possible errors in the combined LLR ratios.

If no error is detected, the deciphering module 30 deciphers at step 134 the decoded PDU packet through the first sequence of ciphering keys.

The separation module 32 separates at step 136 the data of the decoded deciphered PDU packet to supply the binary SDU data. And then, it emits a positive acknowledgment towards the packet formation module 10 of the transmitter 4 to indicate that the packet 52 has been well received with no error.

If at least one error is detected, the method goes on from the step 78 by saving the second LLR ratios calculated by the demodulator 26 and a new transmission of the packet 52.

Thus, according to the second embodiment, the second LLR ratios are the ones to be modified. The deciphering module 30 must in this case apply the first sequence of ciphering keys to decipher the combined packet and not the current key sequence.

FIG. 4 illustrates a first embodiment wherein the first LLR ratios are the ones to be modified.

According to this embodiment, further to the reception of the signal 92 at step 96, the demodulator 26 performs the frame unlocking, i.e. the synchronization of the signal 92, and demodulates it at step 98 according to a flexible decision demodulation mechanism by calculating the second LLR logarithmic likelihood ratios.

At step 120, the deciphering module 30 calculates the difference between the first and the second sequences of ciphering keys. To do so, it performs an "exclusive OR" operation between the two key sequences. It supplies then this difference to the coding sub-module 38 of the decoding module 28. Thus, the security regulations are provided in this case, since no secret information can be recovered outside the deciphering module 30 with no knowledge of the two key sequences.

At step 122, the coding sub-module 38 codes the difference between the key sequences through the detecting code and the error correcting code. It supplies then the coded difference to the demodulator 26.

At step 126, the first LLR ratios are recovered from the buffer memory 34.

At step 140, the demodulator 26 modifies these first LLR ratios through the coded difference according to the following relationship:

$$LLR1\_m(k)=LLR1(k)*(1-2*cod\Delta k) \text{ for } k=0 \ldots N-1,$$

wherein:
N is the number of LLR ratios per coded PDU packet;
cod$\Delta$k is the coded difference;
LLR1(k) is the first LLR ratio; and
LLR1_m(k) is the first modified LLR ratio.

Thanks to the linearity of the detecting and correcting codes and the ciphering, further to this modification, the first modified LLR ratios being obtained correspond to the packet 52 coded and ciphered with the second key sequence.

At step 142, the demodulator 26 performs a HARQ-Chase combination of the modified LLR ratios and of the second LLR ratios simply by summing these LLR ratios so as to obtain combined LLR ratios.

The combined LLR ratios are decoded at step 144 by the error correcting decoding sub-module 36 so as to obtain the decoded PDU packet.

At step 146, the error detecting decoding sub-module 40 detects the presence of possible errors in the combined LLR ratios.

If no error is detected, the deciphering module 30 deciphers at step 148 the decoded PDU packet through the second sequence of ciphering keys.

The separation module 32 separates at step 150 the data of the decoded deciphered PDU packet so as to supply the binary SDU data. Then, it emits a positive acknowledgment towards the packet formation module 10 of the transmitter 4 to indicate that the packet 52 has well been received with no error.

If at least one error is detected, the method goes on from the step 78 by saving the second LLR ratios calculated by the demodulator 26 and a new transmission of the packet 52.

Thus, according to this second embodiment, the first LLR ratios are the ones to be modified. The deciphering module 30 applies in this case the current key sequence so as to decipher the combined packet. This embodiment is thus simpler to implement than the one of FIG. 3 which needs a deciphering with the first key sequence.

FIG. 5 illustrates a fourth embodiment of the invention wherein a new sequence of ciphering keys is generated at the level of the receiver.

According to this embodiment, further to the reception of the emitted signal at step 96, the deciphering module 30 generates at step 160 a new sequence of ciphering keys.

At step 162, the deciphering module 30 calculates a first difference between the first key sequence and the new key sequence and a second difference between the second key sequence and the new key sequence. To do so, it performs an "exclusive OR" operations between the key sequences. Then, it supplies these differences to the coding sub-module 38 of the decoding module 28. Thus, the security regulations are also provided in this case, since no secret information can be recovered outside the deciphering module 30 with no knowledge of the new key sequence.

At step 164, the coding sub-module 38 codes the first and second differences through the detection code and the error correcting code. It supplies then the first and second coded differences to the demodulator 26.

At step 166, the first LLR ratios are recovered from the buffer memory 34.

At step 168, the demodulator 26 modifies these first LLR ratios through the first coded difference according to the following relationship:

$$LLR1\_m(k)=LLR1(k)*(1-2*cod\Delta k1) \text{ for } k=0 \ldots N-1,$$

wherein:
N is the number of LLR ratios per coded PDU packet;
$cod\Delta k1$ is the first coded difference;
$LLR1(k)$ is the first LLR ratio; and
$LLR1\_m(k)$ is the first modified LLR ratio.

Thanks to the linearity of the detecting and correcting codes and of the ciphering, further to this modification, the first modified LLR ratios being obtained correspond to the packet 52 being coded and ciphered with the new key sequence.

At step 170, the demodulator 26 performs the frame unlocking, i.e. the synchronization of the signal 92, and demodulates it according to a flexible decision demodulation mechanism by calculating the second LLR logarithmic likelihood ratios. It modifies these LLR ratios through the second coded difference according to the following relationship:

$$LLR2\_m(k)=LLR2(k)*(1-2*cod\Delta k2) \text{ for } k=0 \ldots N-1,$$

wherein:
N is the number of LLR ratios per coded PDU packet;
$cod\Delta k2$ is the coded difference;
$LLR2(k)$ is the second LLR ratio; and
$LLR2\_m(k)$ is the second modified LLR ratio.

Thanks to the linearity of the detecting and correcting codes and of the ciphering, further to this modification, the second modified LLR ratios being obtained correspond to the packet 52 being coded and ciphered with the new key sequence.

At step 172, the demodulator 26 performs a HARQ-Chase combination of the first modified LLR ratios and of the second modified LLR ratios simply by summing these LLR ratios to obtain combined LLR ratios.

The combined LLR ratios are decoded at step 174 by the error correcting decoding sub-module 36 so as to obtain the decoded PDU packet.

At step 176, the error detecting decoding sub-module 40 detects the presence of possible errors in the combined LLR ratios.

If no error is detected, the deciphering module 30 deciphers at step 178 the decoded PDU packet through the new sequence of ciphering keys.

The separation module 32 separates at step 180 the data of the decoded deciphered PDU packet to supply the binary SDU data.

Then, it emits a positive acknowledgment towards the packet formation module 10 of the transmitter 4 to indicate that the packet 52 has been well received with no error.

If at least one error is detected, the method goes on from the step 78 by saving the second LLR ratios calculated by the demodulator 26 and a new transmission of the packet 52.

Figure 6:
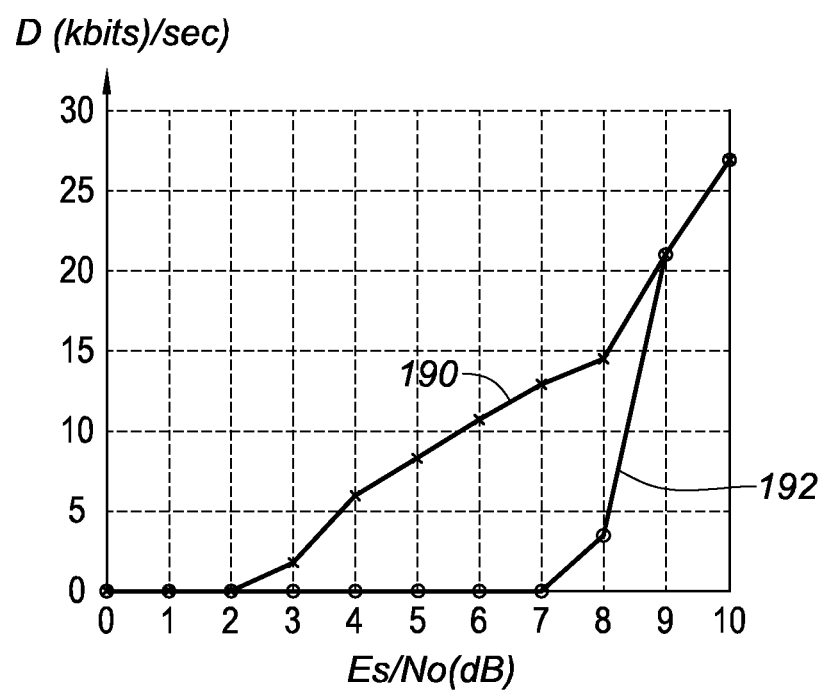
FIG. 6 is a graph illustrating the performances of the method according to the invention.

The graph of FIG. 6 illustrates the performances of an exemplary embodiment implementing the method of the invention.

The first curve 190 of this graph represents the effective data flow rate depending on the signal-noise ratio by using the method of the invention implementing HARQ-Chase combination in the exemplary system being considered.

The second curve 192 of this graph represents the effective data flow rate depending on the signal-noise ratio by using the method of the prior art implementing the ARQ mechanism in the exemplary system being considered.

The flow rate gain brought by the method of the invention for a same signal-noise ratio is significant. As an example, for the exemplary system being considered, for a signal-noise ratio of 8 dB, the method of the invention allows to have a effective data flow rate three times higher than the one obtained with the method of the prior art.

Moreover, this method is very robust. For the exemplary system being considered, the data transmission is in fact possible on conditions of a weak signal-noise ratio (between 3 and 7 dB), whereas it is not with the method of the prior art. As an example, for a signal-noise ratio of 6 dB, the method of the invention allows an effective data flow rate of 11 kbits per second, whereas no transmission is possible with the method of the prior art.

Of course, other embodiments can still be envisaged.

Thus, although the invention has been described for a PMR system, it advantageously applies to any other radio-electric transmission implementing an air interface ciphering.

On the other side, the HARQ procedure being used can be different from the HARQ-Chase procedure described referring to figures, for example a HARQ procedure with incremental redundancy (IR-HARQ). In this last case, the processings referring to the embodiment described in FIG. 2 are the same up to the step 108. At step 110, the LLR ratios are not combined, but simply organized in view of the following decoding. At step 112, this decoding takes in input the whole LLR ratios and decodes the latter according to a code structure globally resulting from the first and second transmissions, for example through a third error correcting code consisting in a concatenation of the first and second error correcting codes used respectively upon the first and second transmissions.

The invention claimed is:

1. A data packet transmission method between a transmitter and a receiver through a radio-electric channel, said method comprising a first transmission of a packet, said first transmission comprising:
steps implemented in the transmitter of:
first linear processing said first transmitted packet so as to obtain a first linear processed packet;
linear error detecting coding the first linear processed packet through an error detecting code so as to obtain a first intermediate packet; and
linear error correcting coding the first intermediate packet through a first error correcting code so as to obtain a first coded packet;
wherein, responsive to the first coded packet being received and detected to be erroneous, second transmitting said first transmitted packet, the second transmission comprising steps implemented in the transmitter comprising:
second linear processing said first transmitted packet, said second linear processing being different from said first processing, so as to obtain a second packet different from the first linear processed packet;
linear error detecting coding the second packet through said error detecting code so as to obtain a second intermediate packet; and
linear error correcting coding the second intermediate packet through a second error correcting code so as to obtain a second coded packet;
steps implemented in the receiver of:
modifying at least one of the first coded packet and the second coded packet so as to obtain two packets in which a difference due to the first and second linear processing is compensated for;
combining both of the first and second coded packets into a combined packet according to a hybrid automatic repeat request (HARQ) procedure; and
decoding the combined packet through a third error correcting code depending on the first and second error correcting codes.

2. The method according to claim 1, wherein the first linear processing is a linear ciphering through a first sequence of ciphering keys and the second linear processing is a linear ciphering through a second sequence of ciphering keys being different from the first sequence.

3. The method according to claim 2, wherein the modification step comprises:
coding the first sequence of ciphering keys through the error detecting code and the first error correcting code and coding the second sequence of ciphering keys through the error detecting code and the second error correcting code;
deciphering the first coded packet through the first sequence of coded keys; and
deciphering the second coded packet through the second sequence of coded keys.

4. The method according to claim 1, wherein the HARQ procedure is a HARQ-Chase procedure.

5. The method according to claim 1, wherein the HARQ procedure is a HARQ procedure with incremental redundancy.

6. A data packet transmission method between a transmitter and a receiver through a radio-electric channel, said method comprising a first transmission of a packet, said first transmission comprising:
steps implemented in the transmitter of:
first linear processing said first transmitted packet so as to obtain a first linear processed packet;
linear error detecting coding the first linear processed packet through an error detecting code so as to obtain a first intermediate packet; and
linear error correcting coding the first intermediate packet through a first error correcting code so as to obtain a first coded packet;
wherein, responsive to the first coded packet being received and detected to be erroneous, second transmitting said first transmitted packet, the second transmission comprising steps implemented in the transmitter comprising:
second linear processing said first transmitted packet, said second linear processing being different from said first processing, so as to obtain a second packet different from the first linear processed packet;
linear error detecting coding the second packet through said error detecting code so as to obtain a second intermediate packet; and
linear error correcting coding the second intermediate packet through a second error correcting code so as to obtain a second coded packet;
steps implemented in the receiver of:
modifying at least one of the first coded packet and the second coded packet so as to obtain two packets in which a difference due to the first and second linear processing is compensated for;
combining both of the first and second coded packets into a combined packet according to a hybrid automatic repeat request (HARQ) procedure; and
decoding the combined packet through a third error correcting code depending on the first and second error correcting codes,
wherein the first linear processing is a linear ciphering through a first sequence of ciphering keys and the second linear processing is a linear ciphering through a second sequence of ciphering keys being different from the first sequence,
wherein the modification step comprises:
coding the difference between the first and second key sequences through the error detecting code and the first or respectively the second error correcting code; and
using the coded difference to modify the first coded packet or respectively the second coded packet.

7. A data packet transmission method between a transmitter and a receiver through a radio-electric channel, said method comprising a first transmission of a packet, said first transmission comprising:
steps implemented in the transmitter of:
first linear processing said first transmitted packet so as to obtain a first linear processed packet;
linear error detecting coding the first linear processed packet through an error detecting code so as to obtain a first intermediate packet; and
linear error correcting coding the first intermediate packet through a first error correcting code so as to obtain a first coded packet;
wherein, responsive to the first coded packet being received and detected to be erroneous, second transmitting said first transmitted packet, the second transmission comprising steps implemented in the transmitter comprising:
second linear processing said first transmitted packet, said second linear processing being different from said first processing, so as to obtain a second packet different from the first linear processed packet;
linear error detecting coding the second packet through said error detecting code so as to obtain a second intermediate packet; and
linear error correcting coding the second intermediate packet through a second error correcting code so as to obtain a second coded packet;
steps implemented in the receiver of:
modifying at least one of the first coded packet and the second coded packet so as to obtain two packets in which a difference due to the first and second linear processing is compensated for;
combining both of the first and second coded packets into a combined packet according to a hybrid automatic repeat request (HARQ) procedure; and
decoding the combined packet through a third error correcting code depending on the first and second error correcting codes,
wherein the first linear processing is a linear ciphering through a first sequence of ciphering keys and the second linear processing is a linear ciphering through a second sequence of ciphering keys being different from the first sequence,
wherein the modification step comprises:
generating a new sequence of ciphering keys;
coding a first difference between the first key sequence and the new key sequence through the error detecting code and the first error correcting code;
coding a second difference between the second key sequence and the new key sequence through the error detecting code and the second error correcting code;
using the first coded difference so as to modify the first coded packet; and
using the second coded difference so as to modify the second coded packet.

8. A data packet transmission system between a transmitter and a receiver through a radio-electric channel, said system comprising:
the transmitter implementing a first transmission of a packet and:
first linear processing said first transmitted packet so as to obtain a first obtained packet;
linear error detecting coding the first obtained packet through an error detecting code so as to obtain a first intermediate packet; and
linear error correcting coding the first intermediate packet through a first error correcting code so as to obtain a first coded packet;
the transmitter further implementing at least a second transmission of said packet and responding to detecting the an erroneous first coded packet once the first coded packet has been received by:
second linear processing of said first transmitted packet, said second linear processing being different from the first linear processing so as to obtain a second obtained packet being different from the first obtained packet;
linear error detecting coding of the second obtained packet through said error detecting code so as to obtain a second intermediate packet; and
linear error correcting coding of the second intermediate packet through a second error correcting code so as to obtain a second coded packet; and
the receiver:
modifying at least one of the first coded packet and the second coded packet so as to obtain two packets in which the difference due to the first and second processing is compensated for;
combining both packets according to a hybrid automatic repeat request (HARQ) procedure; and
decoding the combined packet through a third error correcting code depending on the first and second error correcting codes.

9. A non-transitory storage device storing thereon a computer program comprising instructions for implementing a data packet transmission method between a transmitter and a receiver through a radio-electric channel, said method comprising a first transmission of a packet, said first transmission comprising:
steps implemented in the transmitter of:
first linear processing said first transmitted packet so as to obtain a first linear processed packet;
linear error detecting coding the first linear processed packet through an error detecting code so as to obtain a first intermediate packet; and
linear error correcting coding the first intermediate packet through a first error correcting code so as to obtain a first coded packet;
wherein, responsive to the first coded packet being received and detected to be erroneous, second transmitting said first transmitted packet, the second transmission comprising steps implemented in the transmitter comprising:
second linear processing said first transmitted packet, said second linear processing being different from said first processing, so as to obtain a second packet different from the first linear processed packet;
linear error detecting coding the second packet through said error detecting code so as to obtain a second intermediate packet; and
linear error correcting coding the second intermediate packet through a second error correcting code so as to obtain a second coded packet;
steps implemented in the receiver of:
modifying at least one of the first coded packet and the second coded packet so as to obtain two packets in which a difference due to the first and second linear processing is compensated for;
combining both of the first and second coded packets into a combined packed according to a hybrid automatic repeat request (HARQ) procedure; and
decoding the combined packet through a third error correcting code depending on the first and second error correcting codes.

10. The storage device according to claim 9, wherein the first linear processing is a linear ciphering through a first sequence of ciphering keys and the second linear processing is a linear ciphering through a second sequence of ciphering keys being different from the first sequence.

11. The storage device according to claim 10, wherein the modification step comprises:
coding the first sequence of ciphering keys through the error detecting code and the first error correcting code and coding the second sequence of ciphering keys through the error detecting code and the second error correcting code;

deciphering the first coded packet through the first sequence of coded keys; and deciphering the second coded packet through the second sequence of coded keys.

12. The storage device according to claim 9, wherein the HARQ procedure is a HARQ-Chase procedure.

13. The storage device according to claim 9, wherein the HARQ procedure is a HARQ procedure with incremental redundancy.

14. A non-transitory storage device storing thereon a computer program comprising instructions for implementing a data packet transmission method between a transmitter and a receiver through a radio-electric channel, said method comprising a first transmission of a packet, said first transmission comprising:

steps implemented in the transmitter of:

first linear processing said first transmitted packet so as to obtain a first linear processed packet;

linear error detecting coding the first linear processed packet through an error detecting code so as to obtain a first intermediate packet; and linear error correcting coding the first intermediate packet through a first error correcting code so as to obtain a first coded packet;

wherein, responsive to the first coded packet being received and detected to be erroneous, second transmitting said first transmitted packet, the second transmission comprising steps implemented in the transmitter comprising:

second linear processing said first transmitted packet, said second linear processing being different from said first processing, so as to obtain a second packet different from the first linear processed packet;

linear error detecting coding the second packet through said error detecting code so as to obtain a second intermediate packet; and linear error correcting coding the second intermediate packet through a second error correcting code so as to obtain a second coded packet;

steps implemented in the receiver of:

modifying at least one of the first coded packet and the second coded packet so as to obtain two packets in which a difference due to the first and second linear processing is compensated for;

combining both of the first and second coded packets into a combined packed according to a hybrid automatic repeat request (HARQ) procedure; and decoding the combined packet through a third error correcting code depending on the first and second error correcting codes, wherein the first linear processing is a linear ciphering through a first sequence of ciphering keys and the second linear processing is a linear ciphering through a second sequence of ciphering keys being different from the first sequence, wherein the modification step comprises:

coding the difference between the first and second key sequences through the error detecting code and the first or respectively the second error correcting code; and using the coded difference to modify the first coded packet or respectively the second coded packet.

15. A non-transitory storage device storing thereon a computer program comprising instructions for implementing a data packet transmission method between a transmitter and a receiver through a radio-electric channel, said method comprising a first transmission of a packet, said first transmission comprising:

steps implemented in the transmitter of:

first linear processing said first transmitted packet so as to obtain a first linear processed packet;

linear error detecting coding the first linear processed packet through an error detecting code so as to obtain a first intermediate packet; and linear error correcting coding the first intermediate packet through a first error correcting code so as to obtain a first coded packet;

wherein, responsive to the first coded packet being received and detected to be erroneous, second transmitting said first transmitted packet, the second transmission comprising steps implemented in the transmitter comprising:

second linear processing said first transmitted packet, said second linear processing being different from said first processing, so as to obtain a second packet different from the first linear processed packet;

linear error detecting coding the second packet through said error detecting code so as to obtain a second intermediate packet; and linear error correcting coding the second intermediate packet through a second error correcting code so as to obtain a second coded packet;

steps implemented in the receiver of:

modifying at least one of the first coded packet and the second coded packet so as to obtain two packets in which a difference due to the first and second linear processing is compensated for;

combining both of the first and second coded packets into a combined packed according to a hybrid automatic repeat request (HARQ) procedure; and decoding the combined packet through a third error correcting code depending on the first and second error correcting codes, wherein the first linear processing is a linear ciphering through a first sequence of ciphering keys and the second linear processing is a linear ciphering through a second sequence of ciphering keys being different from the first sequence, wherein the modification step comprises:

generating a new sequence of ciphering keys;

coding a first difference between the first key sequence and the new key sequence through the error detecting code and the first error correcting code;

coding a second difference between the second key sequence and the new key sequence through the error detecting code and the second error correcting code;

using the first coded difference so as to modify the first coded packet; and using the second coded difference so as to modify the second coded packet.

\* \* \* \* \*